United States Patent [19]
Tabler

[11] 3,744,610
[45] July 10, 1973

[54] BOLTLESS ADJUSTABLE FITTING
[75] Inventor: Charles P. Tabler, Hamilton, Ohio
[73] Assignee: Kornylak Corporation, Hamilton, Ohio
[22] Filed: Aug. 27, 1971
[21] Appl. No.: 175,636

[52] U.S. Cl. .......................... 193/35 R, 287/189.35
[51] Int. Cl. .............................................. B65g 13/00
[58] Field of Search ............. 287/189.35, 189.36 A, 287/189.36 C, 189.36 N; 193/35 R, 35 C, 35 J

[56] References Cited
UNITED STATES PATENTS

| | | | |
|---|---|---|---|
| 2,786,578 | 3/1957 | De Graaf et al. | 193/35 R X |
| 2,908,955 | 10/1959 | Brown | 189/35 X |
| 2,889,907 | 6/1959 | Sullivan | 193/35 R |
| 2,969,863 | 1/1961 | Woldring et al. | 193/35 R |

*Primary Examiner*—Evon C. Blunk
*Assistant Examiner*—Hadd S. Lane
*Attorney*—Thomas E. Beall, Jr.

[57] ABSTRACT

In a material handling system a snap-on, boltless adjustable connector or fitting is employed, which includes a one piece connector symmetrical about a plane and provided on opposed sides with S-shaped and the mirror image of S-shaped spring clips for engaging opposed flanges of construction channel members, and suitable means for connecting the one piece connector to another construction member. These means may be an identical one piece connector at right angles to and facing away from the first one piece connector, a plate rigidly connected to the first one piece connector and pivotally connected to a construction member, or a U-shaped channel member connected at right angles to and facing away from the one piece connector so that the opposed legs of the U-shaped channel member may frictionally engage a construction member. The S-and mirror image of S-shaped spring clips are so formed in relation to the flanges they engage that a first portion will wrap around the entire adjacent flange, and that a second portion will present a cam surface for resiliently distorting the clips away from their respective flanges during assembly and after full assembly snap behind the respective flanges, with respect to the direction of entry, to provide a secure connection.

6 Claims, 5 Drawing Figures

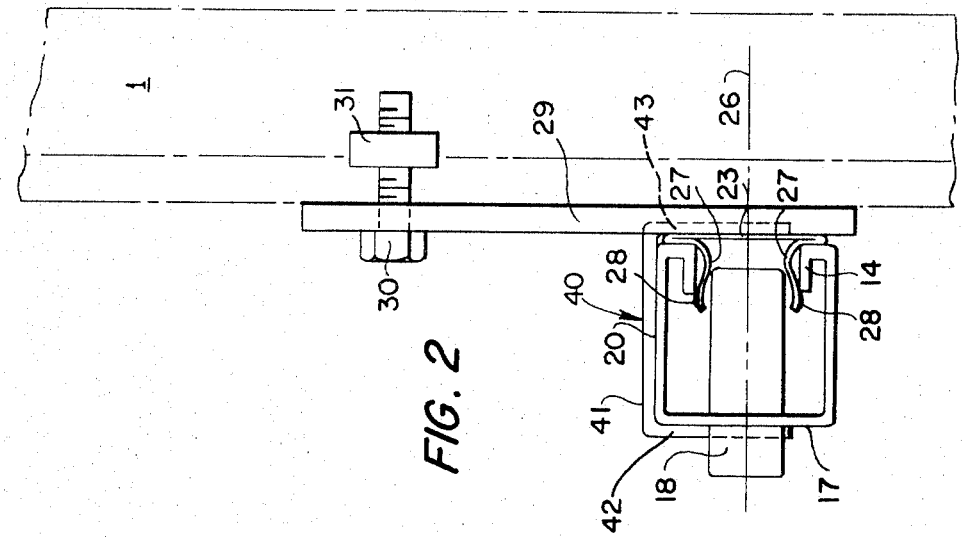
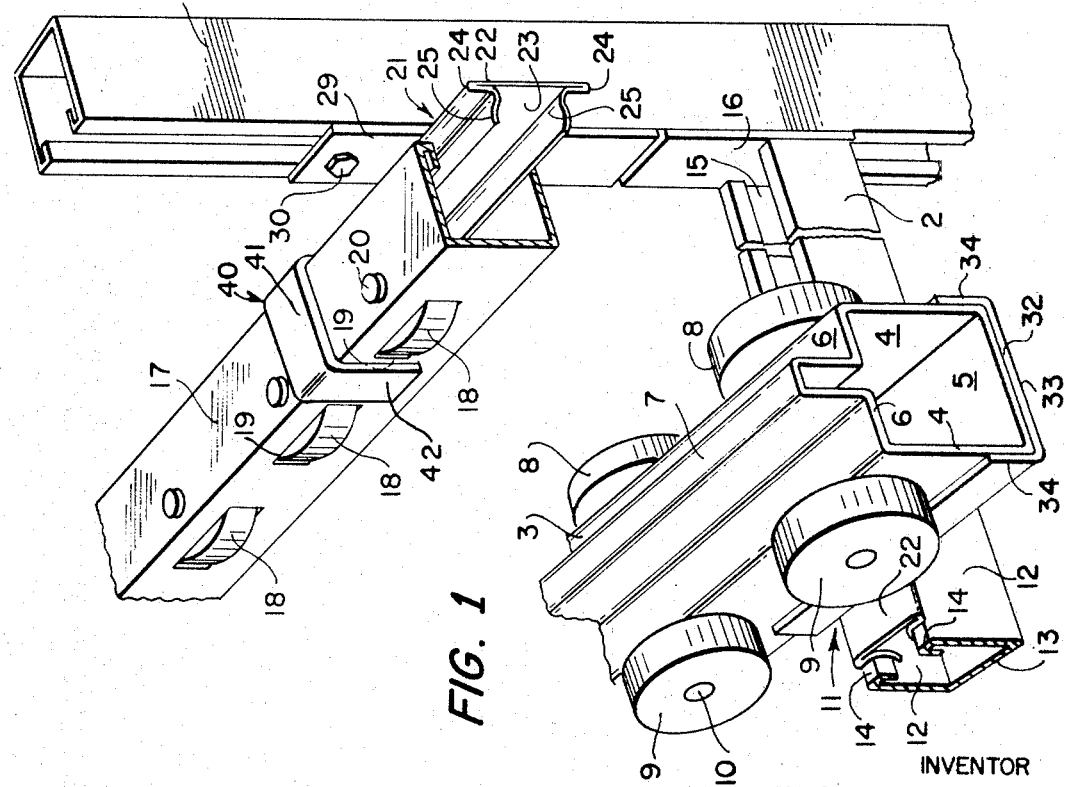

INVENTOR
CHARLES P. TABLER

Thomas E. Beall, Jr.
ATTORNEY

BOLTLESS ADJUSTABLE FITTING

BACKGROUND OF THE INVENTION

In constructing numerous framework assemblies from rails and the like, it has been common practice to employ various types of fasteners such as bolts and screws, and welding. However, such connections require special tools, consume a considerable amount of time, and have limited capabilities with respect to initially adjusting the positioning of the members. In the area of material handling, frameworks constructed of standard tubing or channel rails are required to be set up so that article supporting roller rails may be positioned on the framework according to the size and type of articles to be handled. Particularly in storage facilities, the type of articles to be handled by the same framework will vary periodically, which will require disassembly, readjustment, and reassembly of various connections holding the support rails to the framework. Thus, there is a considerable need, particularly in the area of material handling, for rail connectors that may be assembled without special tools, in a minimum of time, and with infinite adjustability in the range desired, while at the same time being rigid in the assembled position with respect to the forces to be normally encountered and provide a minimum resistance to disassembly.

The material handling environment of the present invention is the same as that of the McGow et al. patent, U.S. Pat. No. 3,077,959, issued Feb. 19, 1963. In this patent, a framework of vertical and horizontal members are rigidly interconnected and carry various roller support members that in turn support articles to be handled. The connectors of the McGow et al. patent desirably provide for relative initial adjustment, but they do not grip the various members with sufficient frictional resistance to prevent undesirable rattling, vibrations and shifting. Further, they must be individually formed from sheet material, which is relatively expensive.

SUMMARY OF THE INVENTION

It is an object of the present invention to provide a connector for framework rails and the like which will provide for desired adjustability, which may be made by cutting desired lengths from stock material, which will not require bolts, welding or the like in final assembly, which may be easily assembled and disassembled without special tools, which will not interfere with rollers carried by the various members to be assembled or articles to be carried thereon, which are inexpensive to manufacture, and which will provide an extremely rigid connection for their size. The primary element of the connector according to the present invention is cut from an indefinite length of stock material formed in transverse cross-section with a bottom connecting wall and upstanding opposed S-shaped and mirror image S-shaped spring clips. The spring clips are so formed that they will wrap around respective opposite flanges of a member to be connected and snap inwardly with portions that also form cam surfaces for resiliently bending the spring clips during assembly. Preferably, the connector is formed of rolled steel so that the work hardening will provide spring steel for the spring clips while producing limited work hardening within the central connecting bottom wall, which is desirable for ease in securing to the other portion of the total connector by welding, bolting or the like. The other portion of the total connector may be formed from a substantially identical one piece connector with opposed spring clips by welding or the like the bottom walls together with the spring clips of the two connectors being at right angles to each other, or the one piece connector with spring clips may be connected to a pivotally mounted plate when it is desired to adjust the angularity between connected members, or the one piece connector with spring clips may be rigidly mounted to a differently formed one piece connector having for example a U-shaped cross-section. When the one piece connector of U-shaped cross-section is employed in the combination as mentioned above, it will not provide as great a frictional connecting force with its member as will be provided by the one piece connector with S and mirror image of S-shaped spring clips.

BRIEF DESCRIPTION OF THE DRAWINGS

Further objects, features and advantages of the present invention will become more clear from the following detailed description of the drawing, wherein:

FIG. 1 is a perspective view of a material handling framework employing the connectors of the present invention, with portions broken away;

FIG. 2 is an elevation view of a portion of FIG. 1, with one of the members being shown in dotted lines to more clearly show the connectors;

DETAILED DESCRIPTION OF THE INVENTION

Figure 3:
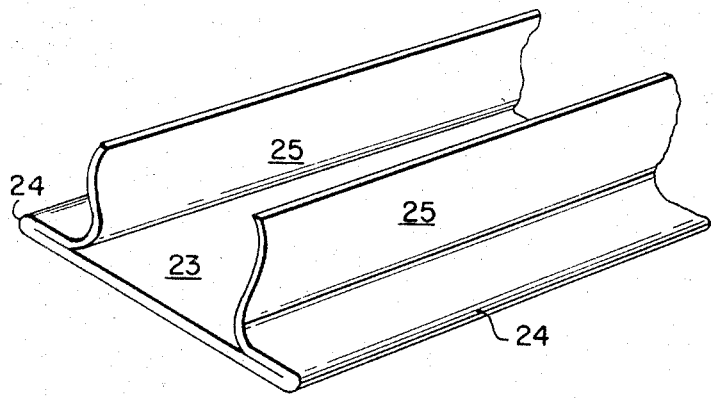
FIG. 3 is a perspective view of an indefinite length of stock one piece connector with opposed S-shaped and mirror image S-shaped spring clips of the present invention.

As shown in FIG. 1, the material handling system of the present invention, in the preferred embodiment, includes a conventional framework having a plurality of parallel vertical standards 1 (only one being shown in the drawing) rigidly interconnected with a plurality of horizontal, parallel brace members 2 (only one being shown in FIG. 1), wherein the brace members are arranged in a plurality of stacked planes sloping toward one delivery end of the framework. Bars carrying rollers are conventionally arranged parallel to each other and perpendicular to the brace members in the stacked planes for supporting articles and moving the articles by gravity toward the one delivery end, so that as one article is removed at the delivery end, all articles in the row behind it will move forward one space by gravity. Since this general framework layout is known, it will not be described in detail and for further details of such a framework, reference may be had to the above identified McGow et al patent. Further, this is only a preferred embodiment and according to the broader aspects of the present invention the roller carrying rail or bar support members and their connectors may be used in many different material handling environments, such as in gravity conveyors for processing equipment.

With particular reference to FIG. 1, the support member or rail 3 is preferably of metal, for example steel, and it may be either extruded or rolled from sheet metal into the illustrated cross-section. In cross-section perpendicular to its length, the support member 3 includes a lower box forming portion having opposed side walls 4, bottom wall 5 and top wall portions 6. Continuing up from the top wall portions 6, there is a downwardly opening U-shaped guide projection 7 that will generally maintain boxes or other like articles in proper position in two parallel rows parallel to and on either side of the projection 7.

The supporting surface of the boxes or like article closest to the guide projection 7 would be supported in the right hand row by rollers 8 and in left hand row by rollers 9. An additional support member with rollers is parallel to and to the right of the support member 3 for supporting the opposite sides of the article support surfaces of the right hand row and a further supporting member with rollers is parallel to and positioned to the left of the support member 3 for supporting the left side of the article support surfaces in the left hand row; these additional support members will be described in more detail later. Aligned pairs of rollers 8 and 9 are rotatably carried by common shafts 10 that are supported in the opposed side walls 4 in a known manner which will not be gone into in detail except to mention that the upper surfaces of the rollers are below the adjacent upper surfaces of the guide projection 7 to deter articles from moving from one row to another.

The support member 3 is carried on the brace member 2 by the novel snap-on connector 11 of the present invention, which will be described in detail later. As shown in cross-section in the left hand portion of FIG. 1, the brace member 2 has opposed side walls 12, bottom wall 13 and inwardly extending flange members 14 that form therebetween a slot 15 that extends longitudinally for the full length of the brace member 2. Each of the flanges 14 is in the form of an L-shaped piece having a first leg portion parallel to the bottom wall 13 and connected to a respective side wall 12, and a second leg portion extending inwardly parallel to the side walls 12. The brace members 2 may be formed of rolled sheet steel, extruded metal or the like.

The opposite ends of the brace members 2 are welded or otherwise rigidly connected to metal end plates 16. The end plates 16 are bolted or otherwise rigidly secured to the vertical standards 1. As seen from the top of the vertical standard 1, or in transverse cross-section, these vertical standards are formed from the same stock material as the brace members 2. This stock material is supplied in convenient lengths and cut to the desired lengths in forming the vertical standards 1 and brace members 2.

To prevent the sides of the boxes or other articles being supported from striking or hanging up on the vertical standards 1, a side support member or rail 17 is secured by a novel connection of the present invention to the vertical standards 1 and provided with a plurality of rollers 18 projecting through suitably formed cut-outs 19 formed in the appropriate wall of the side support member 17. The rollers 18 are journaled by shafts 20 in the side walls of the support member 17. Again, it is seen that the side support members 17 are cut from the same stock material used in fabricating the vertical standards 1 and brace members 2, that is the cross-sections are identical.

A snap-on connector 21, according to the present invention is used for mounting the side support member 17 on the vertical standard 1. As shown, this embodiment includes an elongated single piece connector 22 that may be extruded, but is preferably rolled from sheet steel, with a cross-section as shown in indefinite lengths, so that it may be cut up into desired lengths. The one piece connector 22 is provided with a bottom wall 23, edge bight portions 24, and opposed S-shaped and the mirror image of a S-shaped spring clips 25. The rolling of the sheet steel is most desirable in that it will work harden the spring clip portions standard strip steel into spring steel for tightly engaging the opposed flanges of the side support member 17.

As more clearly seen in the view of FIG. 2, the one piece connector 22 is symmetrical with respect to plane 26. The S-and mirror image of S-shaped spring clips 25 have a first convex portion 27, as seen from the plane of symmetry 26, which extends around the adjacent flange 14 of the side support member 17, and a concave second portion 28, which extends inwardly of and hooks behind the inntermost portion of the adjacent flange 14. Preferably, the extent of the concave portion is about one-half of the extent of the convex portion as measured parallel to the plane of symmetry in FIG. 2. As seen, generally the transition between the convex portion 27 and concave portion 28 engages the adjacent edge of flange 14, and the transition surface between the convex portion 27 and the adjacent leg of the bight portion engages the adjacent edge of the flange 14. The smallest distance between the opposed convex portions 27 as measured perpendicular to the plane of symmetry 26 in FIG. 2 is substantially less than the smallest distance between the opposed portions of the flanges 14, as measured in the same manner. Also, the greatest distance between the concave portions, as measured perpendicularly to the plane of symmetry 26 in FIG. 2, is substantially greater than the abovementioned smallest distance between the flanges 14. Further, it is seen that the spring clips 25 do not in any way interfere with the rotation of the rollers 18.

In assembling the side support member 17 on the one piece connector 22, one flange 14 is hooked behind one of the spring clips 25 by tilting the members relative to each other and the other flange 14 is driven into its illustrated position in FIG. 2 with a hammer or the like. During the driving, the terminal curved edge of the concave portion 28 of the adjacent clip presents a cam surface for engaging the outer edge of the flange 14 to compress the spring clips 25 toward each other so that the concave portion 28 may move inward for subsequent expansion into the illustrated position in FIG. 2 upon completion of the driving. Rolled sheet steel is preferable for forming the one piece connector 22, because the spring clips will be work hardened into spring steel to provide an extremely secure snap frictional engagement with the flanges 14. It is thus seen, that a boltless connection is provided that allows the side support member 17 to be connected in any longitudinal position to the one piece connector 22, while providing a secure connection that will not loosen or slip during usage.

To complete the attachment of the side support member 17 to the vertical standard 1 by using the connector 21, a steel plate or the like 29 is preferably welded to the bottom wall 23 of the one piece connector 22 and secured by means of a bolt 30 to the vertical standard 1 with a nut 31 of conventional construction that may be placed within the slot of the standard 1 and rotated to its locking position. In this manner, the plate 29 is pivotally mounted about the horizontal axis of the bolt 30 so that the angularity of the side support member 17 may match that of the support member 3, which is included for the gravity feed. Although the bolt 30 may be tightened to securely hold the side support member 17 in position by itself, an additional connector 21 may be provided at the opposite end of the side support member 17 for connecting it to another vertical standard.

The one piece connector 22 may be provided in indefinite lengths and cut into lengths according to the desired correlated resistance to separation for the assembled connection. That is, the frictional resistance to separation will be proportional to the length of the engagement between the spring clips 25 and the flanges 14 of the support member, so that the length of the one piece connector 22 will determine the total separation force, which may be matched to that required for proper operation while conserving material and allowing the greatest possible ease of disassembly. Although this frictional resistance is quite adequate for normal usage, experience has shown that many times stock handling personnel will climb on the framework of the material handling system to load and unload packages or the like. Under such usage, the weight of a large man being concentrated on the edge of the support member 17 furthest from the connector 21 will produce a torque that can separate the support member 17 from the one piece connector 22. To completely prevent this, the present invention includes the use of a U-shaped slip-on fitting 40 that includes an upper web wall 41, one leg wall 42 for extending between adjacent rollers 18 without in anyway interfering with their rotation or engagement with packages being guided by the rollers, and an opposite leg wall 43 that extends along the outer surface of the bottom wall 23. Resistance to lateral or horizontal separation of the legs 42, 43 is greatest immediately adjacent the web wall 41, and it is seen that this is exactly where the forces are concentrated caused by a man stepping on the support member 17, because as viewed in FIG. 2, the support member 17, being cantilevered, would tend to rotate in the counter-clockwise direction and pivot about its lower right hand corner with respect to the one piece connector 22 that would remain stationary. Thus, it is seen that the slip-on fitting 40 completely prevents separation of the support member 17 from the one piece connector 22 without in anyway interfering with the function of the rollers 18. Conventional U-shaped steel material supplied in indefinite lengths may be cut to desired width for forming the slip-on fitting 40.

The previously mentioned connector 11 that provides the connection between the support member 3 and the brace member 2 of FIG. 1 includes a length, as determined by the process above, of one piece connector 22 welded at right angles to the bottom surface of the U-shaped channel 32. The channel 32 includes a bottom wall 33 and upstanding generally perpendicular side walls 34. Preferably, the channel 32 is rolled from sheet metal and the side walls 34 formed so that they act as spring clips tightly pressing against the side walls 4 of the support member 3 to securely frictionally hold the support member 3 in position. Due to the configuration of the spring clips 25 on the one piece connector 22, the slight divergence between the bottom wall 5 and the plane of the top surfaces for the flanges 14 due to the inclination of the support member 3 may be accommodated without materially affecting the rigidity of the joint. Further, the upstanding side walls will not interfere with the rollers 9, in that they do not extend upwardly far enough to engage the rollers 9 and 8. Similar to the process described above with respect to the one piece connector 22, the U-shaped channel 32 may be cut in desired lengths from an indeterminate length of stock channel according to the desired frictional resistance to separation.

This connection 11 will thus allow the support member 3 to be placed in any position along the length of the slot 15 during assembling and thereafter prevent such repositioning, and allow original positioning of support member 3 in any longitudinal position within the upwardly opening U-shaped channel 32, while thereafter resisting any repositioning after assembly. The frictinal resistance to separation provided by the spring clips 25 will be much stronger than the frictional resistance to separation provided by the spring clips 34, per longitudinal length, due to the aforementioned configurations of the spring clips 25. Therefore, it will be most desirable to provide a rigid stop (not shown) to prevent the member 3 from longitudinally shifting with respect to the clips 34.

Figure 4:
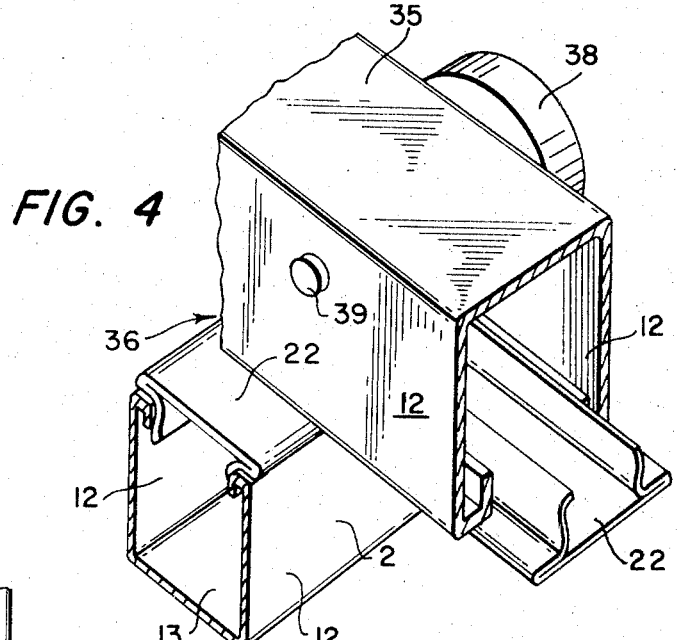
FIG. 4 is a perspective view of a portion of the total material handling system that was removed from FIG. 1 for purposes of illustration.

As mentioned earlier in the specification, an additional support member is preferably placed parallel to and to the right of the support member 3 for further supporting the boxes or other articles in the right hand row. Such a support member is shown in FIG. 4 as it would appear in FIG. 1 within the broken away area of the brace member 2 between the vertical standard 1 and support member 3 if the entire assembly were illustrated in FIG. 1. For some installations, it may be desirable to provide all of the bottom support members of the construction as shown in FIG. 4, or alternatively all the bottom support members may be of the type shown at 17 in FIG. 1, or alternatively the side support member 17 of FIG. 1 may be of the type as shown in FIG. 4, or any combinations thereof.

Figure 5:
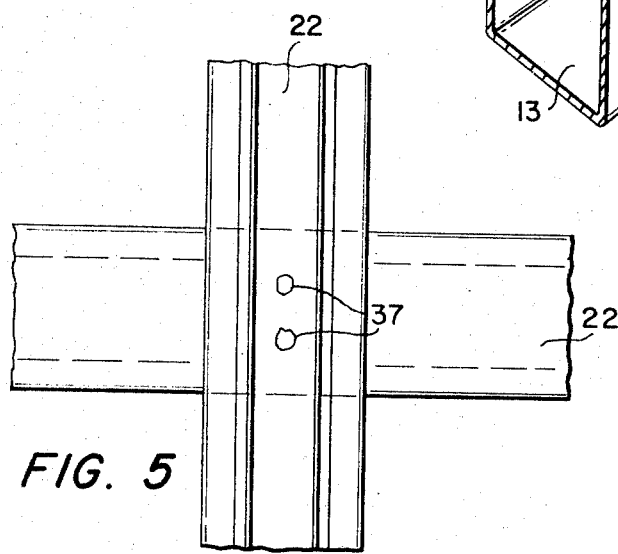
FIG. 5 is a top view of the total connector as used in FIG. 4.

In FIG. 4, the bottom support member or rail 35 has a cross-sectional shape identical to that of the side support member 17 and the brace member 2 of FIG. 1 and accordingly may be cut from the same indefinite length of stock material. The connector 36 between the bottom support member 35 and the brace member 2 is formed from two cut lengths of stock material forming the one piece connector 22, with these two lengths being welded together as shown at 37 in FIG. 5 with their planes of symmetry being perpendicular to each other and their bottom walls 23 engaging each other. Since the one piece connectors 22 of FIGS. 4 and 5 are cut from the same stock material and therefore of identical cross-section as the previously described one piece connectors 22, their structure will not be discussed further, nor will the specific structure of the bottom support 35, since it is cut from the same stock material used to form the brace member 2, the side support member 17, and the vertical standard 1.

For engaging the bottom surface of articles to be carried by the system, the bottom support member 35 is provided along its length with a plurality of rollers 38 (only one being shown), which are journaled on shafts 39 carried in the opposite side walls 12 of the bottom support member 35. If desired, two rollers 38 may be mounted on each of the shafts 39 on opposite sides of the bottom support member 35. Again, the specific lengths of the one piece connectors 22 may be chosen according to the desired frictional resistance to separation as explained above when these lengths are cut from the indefinite length of stock material.

All of the major components of the present invention are constructed from existing stock material, with various plates and U-shaped members being well known and easily cut and drilled as desired. The stock material used to form the support member 17 and the stock material to form the support member 3 are commercially sold as rails to be used for general construction purposes, and only need to be cut to length and assembled with rollers for purposes of the present invention. Further, the one piece connector 22 is commercially available as a closure member or cap for the rail 17, but has not heretofore been used as a means for mounting or supporting any rails. The use of readily-available stock materials greatly simplifies the present invention and reduces costs.

The many advantages of the connectors for the present invention include the ease in assembling rail members with only a hammer or other heavy striking object, the automatic splicing of two rails when they are driven together, the infinite adjustability when used to fasten flow tracks or roller carrying support members to cross or brace members, and the adaptability to connect commercially available roll formed shapes such as those specifically illustrated.

Of the above advantages, perhaps the most important advantage is that of adjustability. In material handling systems, it is necessary to set up a framework that may be used for many different products, not only because various customers have different requirements, but also because the products to be stored and handled will vary from time to time even with the same system. For example, very small boxes may be stored for a period of time and later it will be desired to store quire large boxes on the same line. With reference to FIG. 1, it is seen that the support member 3 may be moved longitudinally from the slot 15 toward and away from the vertical standard 1 or the adjacent support member 3 for correspondingly varying the width available to accommodate a correspondingly sized box or the like; this adjustability is continuous within the range of the standards 1. Further, the support members of FIG. 4 may be correspondingly adjusted to provide support for the other lower end of the boxes or the like. The pivotal action of the bolt 30 will allow the support member 17 to assume any angular relationship within its adjustable plane for accommodating various set-ups and further the support member 17 may be moved to any position along the connector 21 parallel to its slot. Such adjustability may be easily accomplished by merely hitting the various members with a hammer or the like heavy object, and does not require either specific skill or great amount of time.

While one specific embodiment of the material handling system according to the present invention has been described in detail, further variations, embodiments and modifications are contemplated within the spirit and scope of the present invention as defined by the claims. As noted above, all of the parts form a single system although many of the parts are interchangeable. Further, support members may be provided that have other types of roller means, for example balls and suitable sockets. Further, the one piece connector 22 may be used with other types of support rails having a variety of flanges forming a longitudinal slot, with the convex and concave portions 27, 28 being proportioned accordingly. Further, it is contemplated that the one piece connector 22 may be used in many different types of environments, for example in connecting channel members together in the construction of standard shelving or the like.

What is claimed is:

1. A material handling system, comprising: an elongated support member having thereon a plurality of parallel axis roller means aligned and mounted for rotation along its length in the direction of elongation for supportingly engaging articles to be moved by the system; a brace member; one of said members being generally hollow with opposed inwardly extending flanges forming a longitudinally extending slot opening into its interior; a connector having a base for securing it to the other of said members, and further having two spring members integrally extending from said base into said slot and engaging said flanges to form means for frictionally snap-locking said members with respect to each other at any selected position along the longitudinally extending slot; means for securing the other of said members wholly on the side of said base opposite from said spring members; said connector being constructed of sheet metal in one piece with a uniform cross-section throughout its length as measured in the direction of said longitudinal slot, and further being symmetrical with respect to a plane passing equidistant through said longitudinally extending slot and between said spring members; said connector base including a generally rectangular sheet, and opposed longitudinally extending U-shaped edges on opposite sides of said sheet, each having one leg coextensive with the respective sheet side and the other leg extending inwardly above and generally parallel to said sheet; said spring members having an inner portion coextensive with respective ones of said other legs and being generally S-shaped and the mirror image of an S-shape, respectively, in cross-section perpendicular to said longitudinal slot to provide first convex surfaces as seen from the plane adjacent said base extending concavely around respective ones of said bar flanges and second concave surfaces as seen from said plane inwardly of respective ones of said flanges; the smallest dimension between said first convex surfaces as measured parallel to said base in said cross-section being smaller than the spacing between said flanges forming the width of said slot, and the greatest dimension between said second concave surfaces as measured parallel to said base in said cross-section being greater than the width of said slot in the assembled position so that said second convex surfaces constitute cam means for compressing said spring members when said spring members are driven into said slot; and said one member being of generally uniform thickness sheet material having throughout its length a uniform cross-section perpendicular to said longitudinally extending slot, and being defined by two opposed parallel side walls, a perpendicular connecting wall on the opposite side of said one member from said slot and said flanges; said flanges each being generally L-shaped in said cross-section with one leg being perpendicularly connected to a respective one of said side walls and extending inwardly parallel to said connecting wall, and with the other leg extending inwardly generally parallel to said side walls; and the terminal edges of said other legs engaging said spring members and said one legs engaging said base.

2. The system of claim 1, including a second connector having a uniform cross-section identical to said cross-section of said first mentioned connector, but perpendicular thereto, and means rigidly connecting the bases of first and second connectors together; and wherein the other of said members has a longitudinally extending slot perpendicular to said first mentioned longitudinally extending slot and receiving therein the spring members of said second connector.

3. The system of claim 1, including a second connector having a symmetrical shape with respect to a plane extending centrally therethrough and perpendicular to the longitudinal extent of said slot; and said second connector further being constructed in one piece of a general uniform thickness sheet material and having a uniform cross-section throughout its length that is substantially different from the cross-section of said first connector; means rigidly interconnecting said first and second connectors; said second connector further including opposed spring clips extending perpendicularly away from said first connector base; and said second connector spring clips extending along opposite outer sides of said other member to tightly frictionally clamp therebetween said other member.

4. The system of claim 1, including a plate rigidly secured to said connector base and having means pivotally connecting it to said other member for pivoting movement about an axis perpendicular to said plate and base.

5. The system of claim 1, further comprising slip-on fitting means for positively preventing separation of said one of said members and said connector, said slip-on fitting means being U-shaped in cross-section in a plane perpendicular to the longitudinal extent of the member slot and having a first leg extending along one wall of said one of said members, a web portion spanning the adjacent wall of said one of said members and the edge of said connector base, and an opposed leg extending along the outer surface of said connector base when said connector is fully assembled with said one of said members.

6. The system of claim 5, wherein said first leg extends between and spaced from adjacent roller means.

* * * * *